US007320484B2

(12) United States Patent
Wuthrich

(10) Patent No.: US 7,320,484 B2
(45) Date of Patent: Jan. 22, 2008

(54) PLUG-IN SAFETY COUPLING

(76) Inventor: Albrecht Wuthrich, Buholzstrasse, 6110 Wolhusen (CH)

( * ) Notice: Subject to any disclaimer, the term of this patent is extended or adjusted under 35 U.S.C. 154(b) by 219 days.

(21) Appl. No.: 10/469,659

(22) PCT Filed: Feb. 13, 2002

(86) PCT No.: PCT/CH02/00085

§ 371 (c)(1),
(2), (4) Date: Feb. 3, 2004

(87) PCT Pub. No.: WO02/070941

PCT Pub. Date: Sep. 12, 2002

(65) Prior Publication Data

US 2004/0239111 A1 Dec. 2, 2004

(30) Foreign Application Priority Data

Mar. 1, 2001 (CH) .................................... 0381/01

(51) Int. Cl.
*F16L 27/00* (2006.01)
*F16L 27/04* (2006.01)
*F16L 29/00* (2006.01)
*F16K 51/00* (2006.01)

(52) U.S. Cl. ...................... 285/184; 285/263; 285/271; 285/276; 251/89.5; 251/148; 251/352

(58) Field of Classification Search ................ 285/184, 285/276, 283, 325, 271, 261, 263; 251/148, 251/89.5, 111, 113, 114, 352
See application file for complete search history.

(56) References Cited

U.S. PATENT DOCUMENTS 2,632,660 A * 3/1953 Krauthamer ................. 403/53
3,104,897 A * 9/1963 Berger ..................... 285/153.3
3,679,236 A * 7/1972 Warshawsky ................ 285/39
4,180,285 A * 12/1979 Reneau ....................... 285/261
4,397,445 A * 8/1983 Burquier .................. 251/149.9
4,989,791 A * 2/1991 Ridenour .................... 239/579
5,129,584 A * 7/1992 Ridenour .................... 239/579
5,681,027 A * 10/1997 Wuethrich ............... 251/149.2
5,975,490 A * 11/1999 Essman ................... 251/149.4
6,059,325 A * 5/2000 Heckele et al. ............. 285/325
6,123,268 A * 9/2000 Chastine ........................ 239/1
6,705,647 B1 * 3/2004 Palmer ....................... 285/261
6,827,329 B2 * 12/2004 Mikiya et al. ................ 251/97

FOREIGN PATENT DOCUMENTS

EP 0 327 494 A1 1/1989
EP 0 406 203 A2 6/1990
WO WO 94/17322 8/1994

* cited by examiner

*Primary Examiner*—James M. Hewitt
(74) *Attorney, Agent, or Firm*—Fredrikson & Byron, PA

(57) ABSTRACT

A plug-in safety coupling for pressurized conduits includes a blocking element, which is mounted in a coupling housing; the blocking element includes a through bore in which a coupling plug may be introduced in a sealing manner. A pivot path of the coupling housing permits the coupling plug, being introduced into the blocking element, to pivot relative to the housing between a conducting position, in which a through-bore of the blocking element communicates with a compressed air feed bore of the housing, and a blocking position, in which the blocking element blocks the compressed air feed bore. The coupling plug and the blocking element are provided with reciprocally corresponding locking parts to effect a locked retention of the coupling plug in the blocking element.

30 Claims, 3 Drawing Sheets

PLUG-IN SAFETY COUPLING

BACKGROUND

The present invention relates to a safety coupling for pressurised conduits, wherein the safety coupling includes a coupling plug and a coupling housing.

From EP-B-0,598,077 there is known a plug-in safety coupling. With the known safety coupling a pressurised conduit introduction bore is incorporated in the coupling housing and a blocking element with a sealing bore is sealingly mounted therein. A coupling plug may be sealingly introduced into the blocking element and thanks to a slot guide which is present the coupling plug with the blocking element may be pivoted from a blocking position into a conducting position. In the conducting position the pressurised conduit introduction bore is flush with a through bore in the blocking element in which the coupling plug is introduced. The coupling plug comprises a retaining shoulder which on pivoting from the introduction position into the conducting position of the safety coupling comes to bear on the inner side of the coupling housing. In the conducting position thus the bearing pressure of the pressurised medium presses the coupling plug on the inner side onto the coupling housing. The then occurring static friction is directly proportional to the occurring pressure. The known coupling according to the mentioned document EP-B-0,598,077 is usually suitable for pressurised conduits such as are common in workshops, with which there prevails a pressure of a few bar. In this field the known plug-in safety coupling has proven its worth on many occasions. The mentioned safety coupling also represents a suitable solution for smaller dimensions, such as those which are used with pneumatic controls.

A further development of the above mentioned solution is known from EP-B-0,632,872. In this solution there is additionally provided a spring-biased locking means which additionally locks the pivotable blocking element in particular in the conducting position, in order to prevent a decoupling if the two conduit ends to be connected to one another are moved such that under certain circumstances a de-securement would undesirably take place.

With insertable safety couplings for pressurised conduits for transmitting higher pressures one often uses sleeve-like connections which must be mutually screwed. Such connections then however often have no blocking element and may only be coupled in the unloaded condition. Indeed in the building trade one often applies compressors by way of which relatively high pressures are produced. The corresponding pressurised flexible tubings have a relatively large diameter. Accordingly the pressures occurring at the couplings are high. Because the couplings are often subjected to heavy contamination, and in many cases loadings occur due to outside effects, accordingly suitable couplings need to be relatively simple, correspond to high safety demands and must be able to be manufactured inexpensively. It is indeed in the building trade that one often works under the pressure of time. Accordingly it would be advantageous to offer a safety coupling with which the corresponding pressurised flexible tubings may be coupled and decoupled also under the occurring operating pressure. At the same time one must ensure that in the region of the coupling the pressure on decoupling is completely reduced so that a residual pressure does not shoot away the decoupled end of the flexible tubing.

Per se the known previously described solutions with regard to safety technology as well as with regard to the design simplicity and inexpensive manufacture would be suitable in order also to be able to be applied in the building trade. However it has been shown that the occurring pressures are so high that a decoupling is only possible at all with a large force effort. The friction forces between the coupling plug and the coupling housing under the occurring pressure forces are so great that only extremely strong operating persons may decouple such a coupling.

SUMMARY

It is therefore the object of the present invention to create a plug-in safety coupling of the initially described type, with which also pressurised conduits with a greater calibre and under application of a high pressure may be decoupled with a low force effort.

This object is achieved by a plug-in safety coupling including a coupling plug and a blocking element that is sealingly mounted in a coupling housing, wherein the coupling plug and the blocking element each include reciprocally corresponding locking means to effect a locked retention of the coupling plug in the blocking element.

Further advantageous embodiment forms are to be deduced from the dependent claims and their significance and manner of functioning is explained in the subsequent description with reference to the accompanying drawings.

BRIEF DESCRIPTION OF THE DRAWINGS

There are shown in.

DETAILED DESCRIPTION

Figure 1:
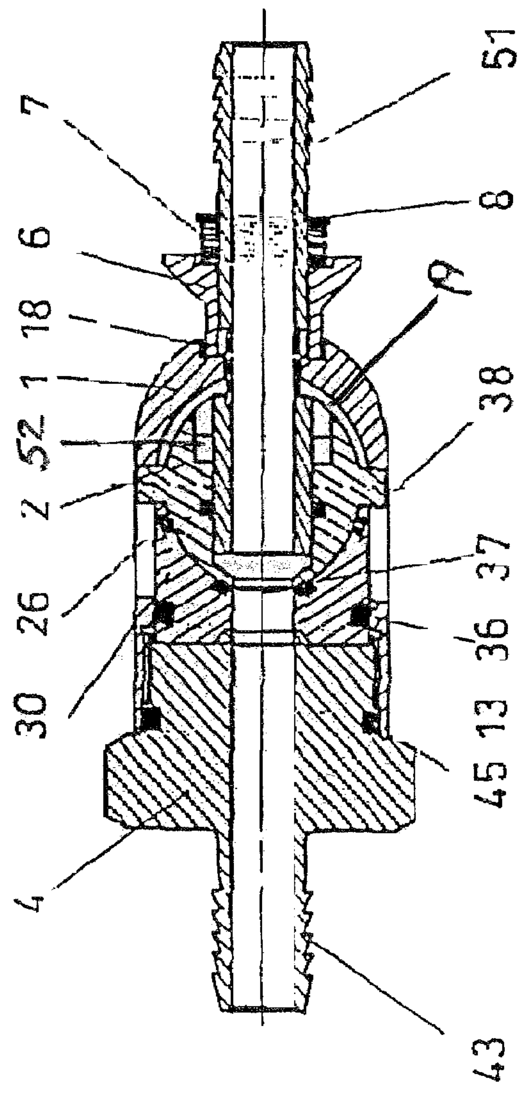
FIG. 1 an axial section through the plug-in safety coupling in the coupled condition.

In FIG. 1 there is shown the complete plug-in safety coupling in the assembled condition in an axial longitudinal section, wherein the section is applied in a plane in which there runs the pivot axis of a blocking element. The most important components of the safety coupling according to the invention are shown individually in section in FIG. 2. The actual coupling consists essentially of four elements. This is the coupling housing 1, a blocking element 2 which sealingly rests in a bearing shell 3 and a screwable stopper 4 which closes the coupling housing and secures the individual elements in their axial position. The actual coupling plug is indicated at 5 which additionally may be provided with a locking sleeve 6 on which there acts a spring 7 which is supported on a safety ring 8.

The coupling housing 1 has a cylindrical wall section 10 which to one side tapers in a dome-shaped manner. This part is subsequently called the head part 11. The open end of the cylindrical wall section 10 has a thread-free sealing region 12 to which there connects a region with an inner thread 13. In the cylindrical wall section 10 there are formed two elongate holes 14 lying diametrically opposite one another and which on the one hand serve the assembly of the blocking element 2 shown here and on the other hand for the bearing of the diametrical pivot of the blocking element 2. In the zenith of the dome-shaped head part 11 there is formed a plug lead-through opening 15. This plug lead-through opening 15 represents the one end of a pivot path 16 which merges into a widened opening 17 which represents the plug introduction opening.

As already mentioned, the blocking element 2 lies within the plug housing 1. The housing 1, at the side lying opposite the stopper 4, has a dome shaped interior, corresponding to the dome-shaped head 11, wherein the radius of the dome shaped interior is larger than the radius of a bearing surface of the bearing shell 3, SO that, between the dome shaped interior and the blocking element 2, there remains an intermediate space 19. Alternately, or additionally, the radius of the dome shaped interior corresponds to that of the blocking element 2, and the centers of the dome shaped interior and the blocking element 2 are displaced such that the intermediate space 19 remains between the dome shaped interior and the blocking element 2. The blocking element 2, consisting essentially of a spherical ball has a pivot 20. The pivot 20 diametrically passes through the sphere. A through-bore 21 likewise runs diametrically and perpendicular to the pivot 20 transversely through the blocking element 2. The through-bore 21 narrows to an air entry opening 23. The end of the through-bore 21 lying opposite serves the introduction of the coupling plug 5. In the region of the introduction side for the plug there are shown the introduction recesses 22 which lie diametrically opposite one another. These introduction recesses 22 open out into an annular groove 24. The introduction recesses 22 and the annular groove 24 form locking means in the blocking element 2. These cooperate with corresponding locking means on the plug 5 which are yet to be described. Furthermore a farther annular groove 25 may be recognised in the through-bore which serves for laying in a sealing ring 26. Whilst the annular groove 24 is a locking groove the annular groove 25 only serves for laying in a sealing ring 26. This sealing ring 26 seals the blocking element with respect to the plug 5 in the introduced condition.

The blocking element 2 lies sealingly and pivotably in the bearing shell 3. The bearing shell 3 has the shape of a cylinder section 30 in which on the one side there is admitted a calotte-shaped deepening 31. The calotte-shaped deepening 31 forms the actual bearing surface for the pivotable blocking element 2. At least one annular groove 32 is admitted in this bearing surface and this groove serves for accommodating a further sealing ring 33. A centric, axial bore 34 forms the air entry opening which in the conducting condition is flush with the through-bore 21. The axial bore 34 has a slight conical enlargement 35.

On assembly of the safety coupling according to the invention as follows one firstly applies the blocking element 2 into the coupling housing 1 until the pivot 20 is mounted in the diametrical elongate holes 14. Thereupon one inserts the bearing shell 3. By way of screwing on the stopper 4, the bearing shell 3 presses the blocking element 2 into the correct end position. The screwable stopper 4 has the shape of a screw with an outer thread 41 which is incorporated on the bolt-like body 40. A polygonal screw head 42 serves for the fastening. The bolt-like body 40 and the screw head 42 are passed through axially by an air feed bore 44. A toothed flexible tubing push-on nipple 43 forms the extension of the air feed bore 44.

As already mentioned the blocking element 2 partly accommodates the coupling plug 5. The coupling plug 5 consists essentially of a cylindrical tube section 50. The exit-side end of this tube section 50 is designed as a toothed flexible tubing push-on nipple 51. At the introduction-side end the tube section 50 comprises a locking means in the form of a locking bolt 52. The locking bolt 52 as shown here, may be designed as a pin passing through the coupling plug 5 diametrically and perpendicular to the direction of the axis. It is however also possible only to integrally form two outwardly projecting bolt sections on the plug. This locking bolt 52 is dimensioned such that the projecting parts may be introduced into the introduction recesses 22 and thereafter come to lie in the locking groove 24 by turning the coupling plug. With this a bayonet-like locking between the coupling plug and blocking element 2 is possible.

Figure 2:
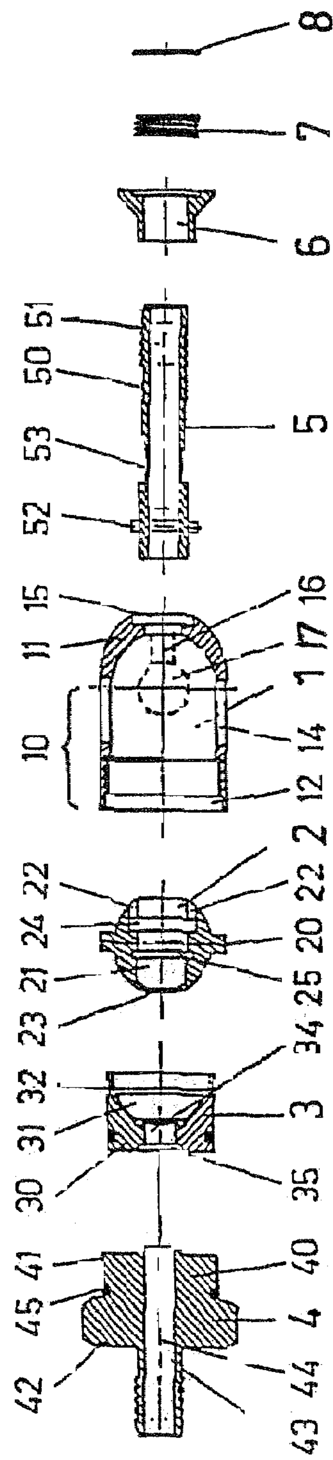
FIG. 2 an exploded drawing of the safety coupling, with which the individual elements are shown in section.

The coupling plug 5 in a middle region comprises two milled recesses 53 lying diametrically opposite one another. The diameter of the tubular section 50 is reduced in the region of the milled recesses 53 so that it corresponds to the width of the pivot path 16. This ensures that the pivot movement of the coupling plug may only be effected if the coupling plug has been rotated by a predefined angle. Indeed the milled recesses 53 and the locking bolts 52 are rotated by 90° to one another. In FIG. 2 this has been deliberately shown wrongly in order in a single figure to render the locking bolt 52 as well as the milled recesses 53 visible.

In the shown solutions in the blocking element 2 in its through-bore there is admitted an annular groove 25 in which a sealing ring 26 is applied. Of course the sealing between the blocking element 2 and the coupling plug 5 may be effected by an annular groove in the tube section 50 and a sealing ring applied therein. This solution is not shown here.

Furthermore a locking sleeve 6 is held on the tube section. This locking sleeve 6 in the coupled condition is pressed towards the coupling housing 1. For this there is provided a compression spring 7 which is held by a securing ring 8 on the coupling plug 5.

One variant of the locking possibilities between the blocking element 2 and the coupling plug 5 is shown by way of FIGS. 3 to 7. Here too the blocking element 2 is designed in the shape of a ball. The pivot 20 here is however not formed as one piece of the same material as the blocking element itself, but of two pin bolt sections 27 lying diametrically opposite one another. This permits the coupling housing 1 to also be manufactured in a simple manner in that in this case one may do away with the elongate holes 14 and instead of these one only needs to provide a diametrical bore. On assembly one only needs to position the coupling housing 1 and the blocking element 2, whereupon then the two pin bolt sections 27 may be knocked in. In principle it is also conceivable instead of two pin bolt sections 27 to insert a through-pin.

With the embodiment form described here the locking between the blocking element 2 and the coupling plug 5 is simplified with regard to manufacturing technology. Thus here the two introduction recesses 22 lying diametrically opposite one another are missing and instead of these several locking bolts 28 which are directed to the axis of the through-bore 21 and which run in a plane perpendicular to this axis are pressed into corresponding bores. The annular groove 25 which serves for applying a sealing ring, in contrast to the embodiment according to FIG. 2 is arranged displaced closer towards the coupling plug introduction side.

Figure 4:
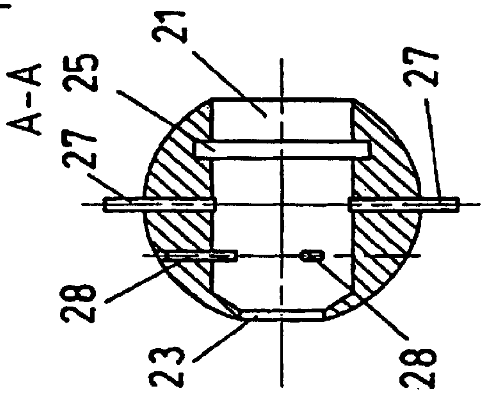
FIG. 4 a section through the same blocking element along line A-A according to FIG. 3.
Figure 3:
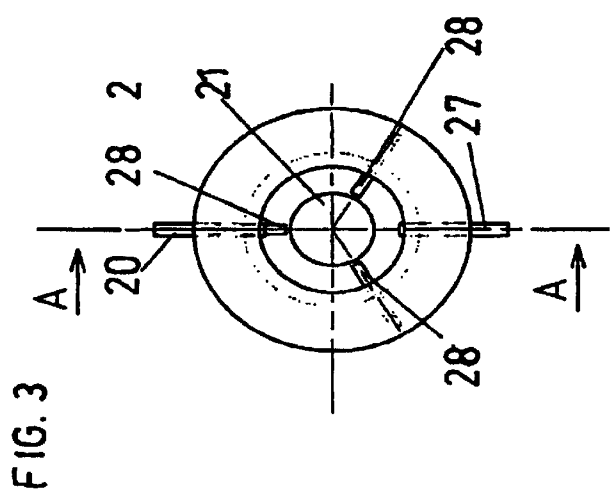
FIG. 3 a front section of a blocking element.
Figure 5:
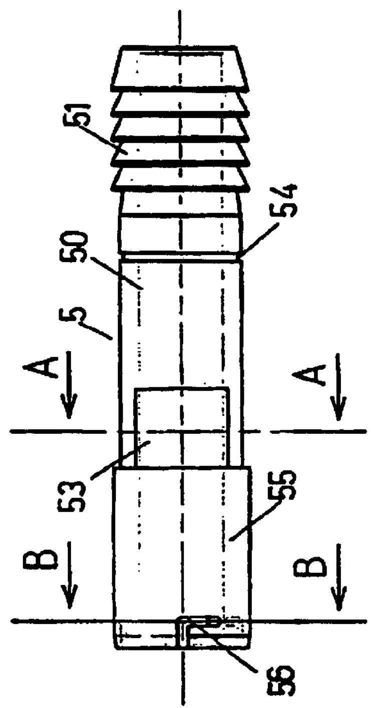
FIG. 5 shows a lateral view of a plug which fits with a blocking element according to FIGS. 3 and 4.
Figure 6:
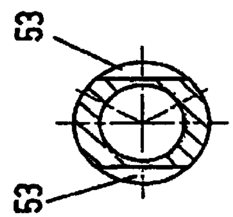
FIG. 6 shows a vertical section along line A-A.
Figure 7:
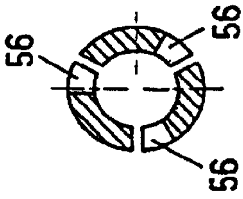
FIG. 7 a vertical section along line B-B as drawn in FIG. 5.

A coupling plug 5 adapted to the blocking element according to the FIGS. 3 and 4 is shown in the FIGS. 5 to 7. Here too the coupling plug 5 consists of a tube section 50 completely analogously to the embodiment according to FIG. 2. On the exit side this tube section 50 is formed in a toothed flexible tubing push-on nipple 51. A notch 54 serves for retaining the securement disk 8. Here too there are again provided milled recesses 53 which as mentioned only permit a pivoting of the coupling plug 5 if this has been rotated by a predefined angle and if at the same time it has been ensured that the locking parts are engaged. Only then may the plug 5 be moved in the pivot path 16. The part of the coupling plug 5 which may be introduced into the blocking element 2 comprises a thickened part 55. At the location of the locking bolt 52 with this version there is a correspondingly relieved locking path 56. With this there are provided just as many locking paths 56 as locking bolts 28 present in the blocking element 2. In the present example this is three locking bolts 28 and accordingly three locking paths 56. Here too the locking paths are designed similarly to a bayonet closure.

Although such an embodiment form is not shown in the drawing, it is indeed possible to design the blocking element cylindrically instead of spherically. In such a case, as in the shown example, the blocking element 2 may have a corresponding pivot or this may only be virtually present, whilst the blocking body itself in principle forms the pivot. With such an embodiment form one would of course also accordingly adapt the outer shaping of the coupling housing.

Figure 8:
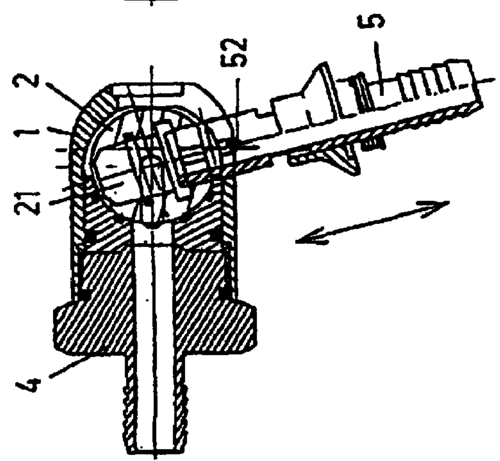
FIGS. 8 to 10 show the safety coupling in three various functional positions.
Figure 9:
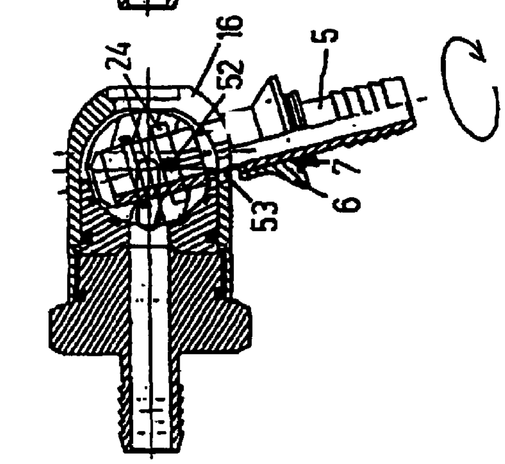
Figure 10:
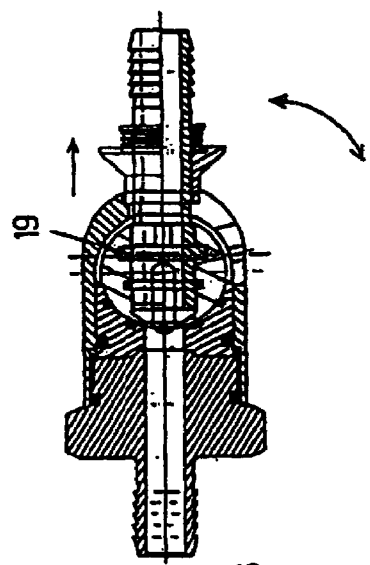

Now by way of FIGS. 8 to 10 the functioning of the plug-in safety coupling according to the invention is described. In FIG. 8 there is shown the position in which the coupling plug 5 may be introduced or withdrawn. In the position shown here the plug 5 is firstly partly introduced into the blocking element 2 in its through-bore 21. The locking bolt 52 at the same time during introduction engages into the introduction recesses 22.

If the coupling plug 5 has been completely pushed into the blocking element 2 or its through-bore 21 then it may be rotated about its longitudinal axis. On rotation then the locking bolt 52 moves into the locking groove 21 and the milled recesses 53 come into the position aligned to the pivot path 16. In the FIG. 9 the coupling plug 5 is shown in the position in which it has not yet been rotated. The locking sleeve 6 in this position under pressure of the compression spring 7 lies laterally of the pivot path 16 on the coupling housing 1. During the pivoting then the plug with its bolt 52 is secured in the locking groove against being pressed out. Even if this bolt should break, the pressure of the plug is accommodated since then the milled recesses 53 come to bear on the coupling housing. After rotation of the coupling plug 5 then the pivoting movement of the plug 5 and the blocking element 2 may be carried out until the coupling plug 5 is aligned exactly flush to the air feed bore 44 of the screwable stopper 4. In this position then the air feed bore 44, the axial bore 34 in the bearing shell 3 and the through-bore 21 in the blocking element 2 together with the tube section 50 of the coupling plug 5 lie in an axially flush alignment to one another. In this position then the locking sleeve 6 may be locked into a lock deepening 18. Thus the position of the coupling plug relative to the coupling housing is secured and simultaneously the position of the pivotable blocking element 2 in the inside of the coupling housing. Upon release of the locking sleeve 6, the coupling plug 5 and the blocking element 2 may be brought back, along the pivot path 16, from a conducting position, in which plug 5 is aligned to the air feed bore 34, as shown in FIG. 10, to a blocking or sealing position in which the blocking element 2 blocks the bore 34, as shown in FIGS. 8 and 9.

Of course it immediately occurs to the attentive observer that the blocking element 2 on the exit side is not sealed with respect to the coupling housing 1. Rather one may even recognise a gap-like intermediate space 19. As mentioned initially the coupling according to the invention should also be able to be easily decoupled under the load of the prevailing compressed air. This is possible without any problem. The force bearing on the coupling plug 5 is completely accommodated in the blocking element 2 by the locking bolt 52 which lies in the blocking groove 24. As a result of this, this force does not need to be overcome for pivoting the coupling plug 5. If under load one pivots the coupling plug 5 from the position as is shown in FIG. 10 back into the position according to FIG. 8, then the air entry opening 23 firstly comes from a conducting position into a sealing position with respect to the bearing shell 3, whereupon in the completely pivoted position the air entry opening 23 of the blocking element 2 comes into communicating connection with the gap-like intermediate space 19. At the same time then the pressure which is still present in the flexible tubing may be relieved in that the air may escape into the intermediate space 19 and from here out of the coupling housing 1. At the same time there exists no danger that the coupling plug 5 may be slung out of the coupling housing 1 since the locking elements 24, 52 are still in engagement with one another. If the residual pressure has been relieved then the coupling plug may also be rotated and pulled out again without any force effort.

Figure 11:
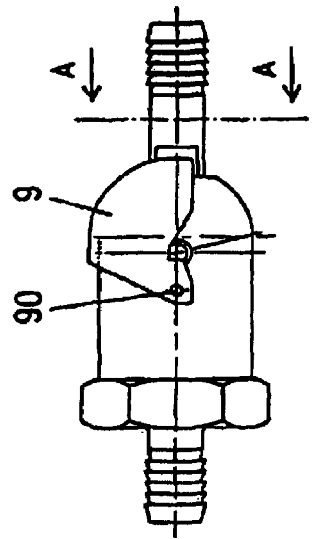
FIGS. 11 and 12 show a variant of the safety coupling with a pivotable protective cap and FIG. 13 a detail of the safety coupling according to a further variant, in an enlarged scale.
Figure 12:
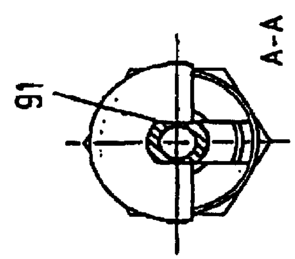

Since as has already been mentioned the safety coupling according to the invention is also to be used on the construction site, it is useful to secure the coupling from contamination. In the FIGS. 11 and 12 there is shown a solution according to this, in which a cap 9 is pivotably arranged on the coupling housing about a pin 90. The cap 9 may simultaneously replace the function of the locking sleeve 6 if one provides the cap with suitable positive-fit recesses 91.

Figure 13:
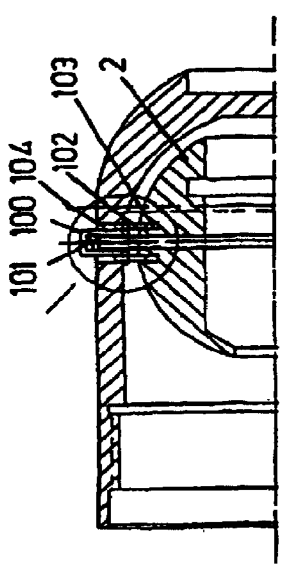

In FIG. 13 there is finally shown a further variant of the locking of the blocking element 2 shown in the conducting position and in the introduction position. This is effected via a pivot bearing bushing which is arranged about the pivot and which is displaceable in the axial direction. This bearing bushing 10 accommodates the compression spring 101. The bushing is provided with locking bolts 102 which engage into lateral recesses 104 in the coupling housing 1 and into corresponding bores 103 in the blocking element 2. The bolts 102 are rigidly connected to the bearing sleeve 100. If one presses on the bearing sleeve 100 then the spring 101 is pressed together, the bolts in the lateral recesses 104 are no longer in engagement and the blocking element 2 may be pivoted. During pivoting the locking bolts 102 may lie on the inner side of the coupling housing 1 and as soon as the blocking element 2 has reached the position according to FIG. 5, the locking bolts 102 again snap into corresponding recesses 104 by which means the blocking element 2 is again held in a locked, defined position.

The invention claimed is:

1. A plug-in safety coupling for pressurized conduits, comprising:

a coupling plug;

a coupling housing including a compressed air feed bore, and a recess forming a pivot path; and a blocking element including a through-bore in which the coupling plug may be introduced in a sealing manner, the blocking element sealingly mounted in the coupling housing;

wherein the pivot path of the coupling housing permits the coupling plug, being introduced into the blocking element, to pivot relative to the coupling housing such that the blocking element may be brought from a conducting position, in which the through-bore of the blocking element communicates with the compressed air feed bore of the coupling housing, into a blocking position, in which the blocking element blocks the compressed air feed bore; and the blocking element and the coupling plug each include reciprocally corresponding locking means to effect a locked retention of the coupling plug in the blocking element.

2. A safety coupling according to claim 1, wherein the blocking element has a cylindrical shape.

3. A safety coupling according to claim 1, wherein the blocking element has an essentially spherical shape and comprises a pivot.

4. A safety coupling according to claim 3, wherein the pivot includes two pivot bolts integrally formed with the blocking element.

5. A safety coupling according to claim 3, wherein the pivot includes a pivot pin crossing the blocking element.

6. A safety coupling according to claim 3, wherein the pivot includes two pivot bolt sections which lie opposite one another and which are fastened in the blocking element.

7. A safety coupling according to claim 3, wherein the pivot lies in a bearing bushing which is displaceable in the axial direction under spring pressure, the bearing bushing holding bolts which in the blocking position engage into lateral recesses of the coupling housing and into fitting bores in the blocking element.

8. A safety coupling according to claim 3, wherein the coupling housing comprises two elongate holes lying opposite one another, in which the pivot of the blocking element lies.

9. A safety coupling according to claim 1, wherein the coupling housing includes an entry side having a sealing stopper surrounding at least a portion of the compressed air feed bore.

10. A safety coupling according to claim 9, further comprising a bearing shell sealingly mounted in the coupling housing between the blocking element and the sealing stopper, wherein the bearing shell comprises a spherical bearing surface and an axial through-bore communicating with the compressed air feed bore.

11. A safety coupling according to claim 10, wherein the sealing stopper directly or indirectly presses the bearing shell onto the blocking element.

12. A safety coupling according to claim 10, wherein the bearing shell comprises at least one annular groove formed in the bearing surface to receive a sealing ring.

13. A safety coupling according to claim 10, wherein the spherical bearing surface is calotte-shaped.

14. A safety coupling according to claim 13, wherein the coupling housing comprises two elongate holes lying opposite one another for pivotally supporting the blocking element.

15. A safety coupling according to claim 10, wherein the coupling housing has a dome shaped interior facing the spherical bearing surface of the bearing shell, the dome shaped interior having a radius that is larger than a radius of the bearing surface to leave a space between the dome shaped interior and the blocking element.

16. A safety coupling according to claim 10, wherein the coupling housing has a dome shaped interior facing the spherical bearing surface of the bearing shell, the dome shaped interior having a radius that corresponds to a radius of the spherical blocking element, and a center of the blocking element being offset from a center of the dome shaped interior to leave a space between the dome shaped interior and the blocking element.

17. A safety coupling according to claim 1, wherein the locking means of the blocking element comprises at least one locking pin projecting into the through-bore.

18. A safety coupling according to claim 17, wherein the at least one locking pin comprises three locking pins.

19. A safety coupling according to claim 17, wherein the locking means of the coupling plug comprises an axially running recess which is aligned to the at least one locking pin and which merges into a radially running recess and as a result forms a locking path which permits a bayonet-like locking.

20. A safety coupling according to claim 1, wherein the locking means of the blocking element comprises at least one axially running recess which merges into a radially running recess.

21. A safety coupling according to claim 20, wherein the locking means of the coupling plug comprises at least one locking pin which engages into the axially and radially running recesses of the blocking element.

22. A safety coupling according to claim 21, wherein the at least one locking pin crosses the coupling plug.

23. A safety coupling according to claim 21, wherein the at least one locking pin comprises several radially displaced locking pegs integrally formed on an outer surface of the coupling plug.

24. A safety coupling according to claim 1, wherein the pivot path has an enlarged introduction opening in an insertion and withdrawal position.

25. A safety coupling according to claim 1, wherein the coupling plug includes two recesses lying opposite one another so that a width of the coupling plug in the region of the recesses is smaller than a width of the pivot path.

26. A safety coupling according to claim 25, further comprising a pivotable cap to cover the recess forming the pivot path, the cap including positive-fit recesses to engage the recesses of the coupling plug when the coupling plug and the blocking element are in the conducting position.

27. A safety coupling according to claim 1, further comprising a spring-biased locking sleeve attached on the coupling plug to engage, with a positive fit, a locking deepening of the coupling housing, when the coupling plug and the blocking element are in the conducting position.

28. A safety coupling according to claim 1, further comprising a pivotable cap to cover the recess forming the pivot path.

29. A safety coupling according to claim 28, wherein the pivotable cap automatically moves to cover the recess forming the pivot path under a spring force.

30. A safety coupling according to claim 1, wherein the coupling plug includes at least one sealing ring to seal the plug with respect to the blocking element.

* * * * *